(12) United States Patent
Nakanishi

(10) Patent No.: US 8,824,789 B2
(45) Date of Patent: Sep. 2, 2014

(54) IMAGE ENCODE CONTROLLER, IMAGE ENCODER AND COMPUTER IMPLEMENTED METHOD FOR ENCODING IMAGE DATA

(75) Inventor: Keiri Nakanishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 13/597,183

(22) Filed: Aug. 28, 2012

(65) Prior Publication Data

US 2013/0243315 A1 Sep. 19, 2013

(30) Foreign Application Priority Data

Mar. 14, 2012 (JP) ................................. 2012-056991

(51) Int. Cl.
*G06K 9/00* (2006.01)
*G06K 9/36* (2006.01)

(52) U.S. Cl.
USPC ............................ 382/166; 382/232; 382/251

(58) Field of Classification Search
None
See application file for complete search history.

(56) References Cited

U.S. PATENT DOCUMENTS

| | | | |
|---|---|---|---|
| 6,005,982 A | 12/1999 | Abe | |
| 7,127,115 B2 | 10/2006 | Osawa et al. | |
| 8,014,448 B2 * | 9/2011 | Song et al. | 375/240.03 |
| 2006/0171460 A1 * | 8/2006 | Masuda et al. | 375/240.03 |
| 2007/0092001 A1 | 4/2007 | Arakawa | |
| 2008/0170627 A1 * | 7/2008 | Yamada et al. | 375/240.24 |
| 2008/0317377 A1 * | 12/2008 | Saigo et al. | 382/274 |
| 2010/0020869 A1 * | 1/2010 | Ikeda | 375/240.03 |
| 2012/0057784 A1 * | 3/2012 | Horiuchi et al. | 382/166 |

FOREIGN PATENT DOCUMENTS

| | | |
|---|---|---|
| JP | H08-116543 | 5/1996 |
| JP | H10-075449 | 3/1998 |
| JP | 2003-283844 | 10/2003 |
| JP | 3735875 | 1/2006 |
| JP | 2006-271002 | 10/2006 |
| JP | 2007-116558 | 5/2007 |

* cited by examiner

*Primary Examiner* — Li Liu
(74) *Attorney, Agent, or Firm* — Knobbe, Martens, Olson & Bear LLP

(57) ABSTRACT

According to one embodiment, an image encode controller includes a chroma component adjuster, a difference generator, a quantizer, an inverse-quantizer, and a variable codeword length encoder. The chroma component adjuster adjusts an original color component in accordance with a quantization coefficient to generate an adjusted chroma component. The difference generator generates a difference pixel component. The quantizer quantizes an output of the difference generator based on the quantization coefficient. The inverse-quantizer inversely quantizes an output of the quantizer based on the quantization coefficient. The variable codeword length encoder performs variable codeword length encoding with respect to an output of the quantizer to generate encoded data. The difference generator generates the difference pixel component based on a pixel component corresponding to an i-th pixel (where i denotes natural number), the adjusted chroma component, and an output of the inverse-quantizer corresponding to the (i−1)th pixel.

20 Claims, 11 Drawing Sheets

IMAGE ENCODE CONTROLLER, IMAGE ENCODER AND COMPUTER IMPLEMENTED METHOD FOR ENCODING IMAGE DATA

CROSS REFERENCE TO RELATED APPLICATIONS

This application is based upon and claims the benefit of priority from the prior Japanese Patent Application No. 2012-056991, filed on Mar. 14, 2012, the entire contents of which are incorporated herein by reference.

FIELD

Embodiments described herein relate generally to an image encode controller, an image encoder, and a computer implemented method for encoding image data.

BACKGROUND

Generally, an image encoder encodes image data by quantizing the image data, thereby generating encoded image data. At the time of quantizing image data, the image encoder uses a quantization coefficient. The larger the quantization coefficient is, the larger the encode rate is, and the larger a quantization error is. When the quantization error becomes large, the quality of a decoded image obtained by decoding the encoded image data deteriorates.

Conventionally, the image encoder encodes image data without consideration of a quantization error, so that deterioration in the quality of a decoded image cannot be prevented.

DETAILED DESCRIPTION

Embodiments will now be explained with reference to the accompanying drawings.

In general, according to one embodiment, an image encode controller includes a chroma component adjuster, a difference generator, a quantizer, an inverse-quantizer, and a variable codeword length encoder. The chroma component adjuster adjusts an original color component of an original pixel of original image data in accordance with a quantization coefficient to generate an adjusted chroma component. The difference generator generates a difference pixel component. The quantizer quantizes an output of the difference generator on the basis of the quantization coefficient. The inverse-quantizer inversely quantizes an output of the quantizer on the basis of the quantization coefficient. The variable codeword length encoder performs variable codeword length encoding with respect to an output of the quantizer to generate encoded data. The difference generator generates the difference pixel component on the basis of a pixel component corresponding to an i-th pixel (where i denotes natural number), the adjusted chroma component, and an output of the inverse-quantizer corresponding to the (i−1)th pixel.

Figure 1:
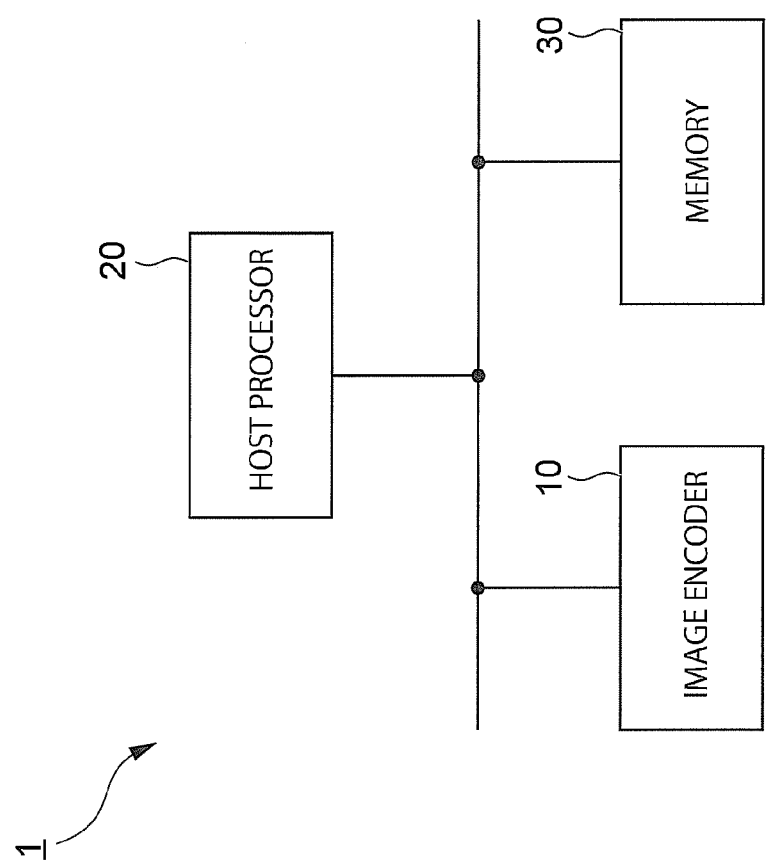
FIG. 1 is a block diagram of an image processing system 1 of an embodiment.

FIG. 1 is a block diagram of an image processing system 1 of an embodiment. The image processing system 1 has at least one image encoder 10, a host processor 20, and a memory 30.

The host processor 20 generates an image encode control signal for controlling the image encoder 10. The image encoder 10 encodes image data on the basis of the image encode control signal, thereby generating encoded data, and writes the encoded data into the memory 30. For example, the host processor 20 is a CPU (Central Processing Unit), and the memory 30 is a DRAM (Dynamic Random Access Memory).

(First Embodiment)

Figure 2:
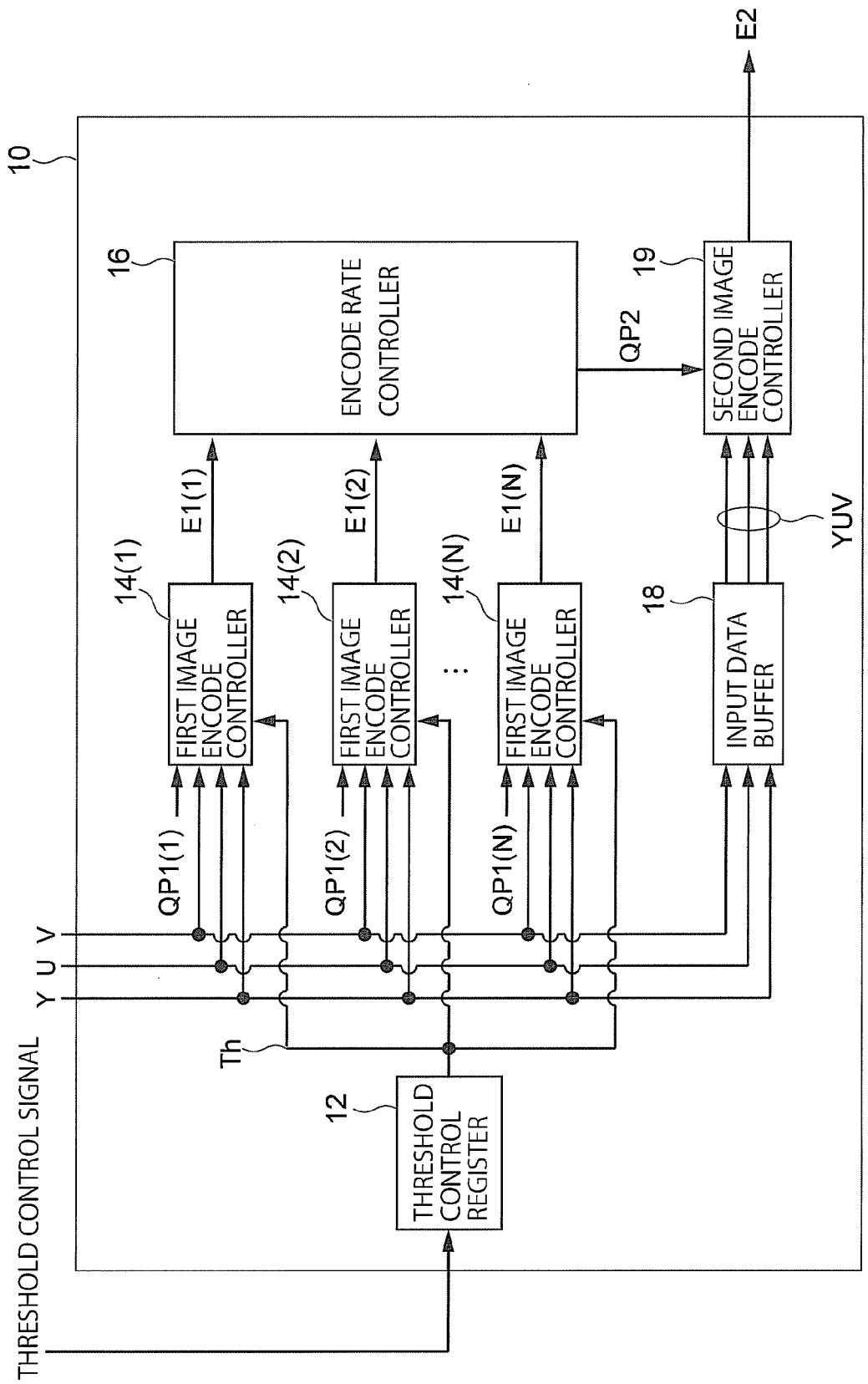
FIG. 2 is a block diagram of the image encoder 10 of the first embodiment.

The first embodiment is an example of an image encoder, improving the quality of a decoded image in consideration of a quantization error of hue. FIG. 2 is a block diagram of the image encoder 10 of the first embodiment. The image encoder 10 has a threshold control register 12, N (N is an integer of two or larger) pieces of first image encode controllers 14(1) to 14(N), an encode rate controller 16, an input data buffer 18, and a second image encode controller 19.

The threshold control register 12 controls a threshold Th to be supplied to the first image encode controllers 14(1) to 14(N). Concretely, the threshold control register 12 generates the threshold Th on the basis of a threshold control signal. The threshold control signal depends on the image encode control signal.

The first image encode controllers 14 (n:n=1 to N) receive first quantization coefficients QP1($n$) and original pixel components (YUV components: a luminance component Y, a first chroma component U, and a second chroma component V) of original image data. The first image encode controllers 14 encode the original pixel components on the basis of the first quantization coefficients QP1($n$), thereby generating first encoded data E1($n$). The first quantization coefficients QP1($n$) depend on the image encode control signal. Since the first quantization coefficients QP1(1) to QP(N) are different from one another, the sizes of the first encoded data E1(1) to E1(N) are also different from one another.

The encode rate controller 16 determines a second quantization coefficient QP2 to be supplied to the second image encode controller 19 on the basis of first encoded data E1(1) to E1(N). For example, the encode rate controller 16 selects, as the second quantization coefficient QP2, a quantization coefficient corresponding to encoded data whose encode rate is the minimum and which does not exceed a target encode rate from the first encoded data E1(1) to E1(N).

The input data buffer 18 receives the YUV components of the original image data, holds the YUV components of the original image data until the second quantization coefficient QP2 is supplied to the second image encode controller 19 and, when the second quantization coefficient QP2 is supplied to the second image encode controller 19, outputs the held YUV components of the original image data at a predetermined timing. The input data buffer 18 may not be provided. The predetermined timing is a timing when the input data buffer 18 receives original image data corresponding to any of the half of one line, one line, and predetermined number of lines.

The second image encode controller 19 receives the second quantization coefficient QP2 and outputs of the input data buffer 18 (that is, the original pixel components (YUV components) of the original image data), and the second image encode controller 19 encodes the original pixel components on the basis of the second quantization coefficient QP2, thereby generating second encoded data E2.

Figure 3:
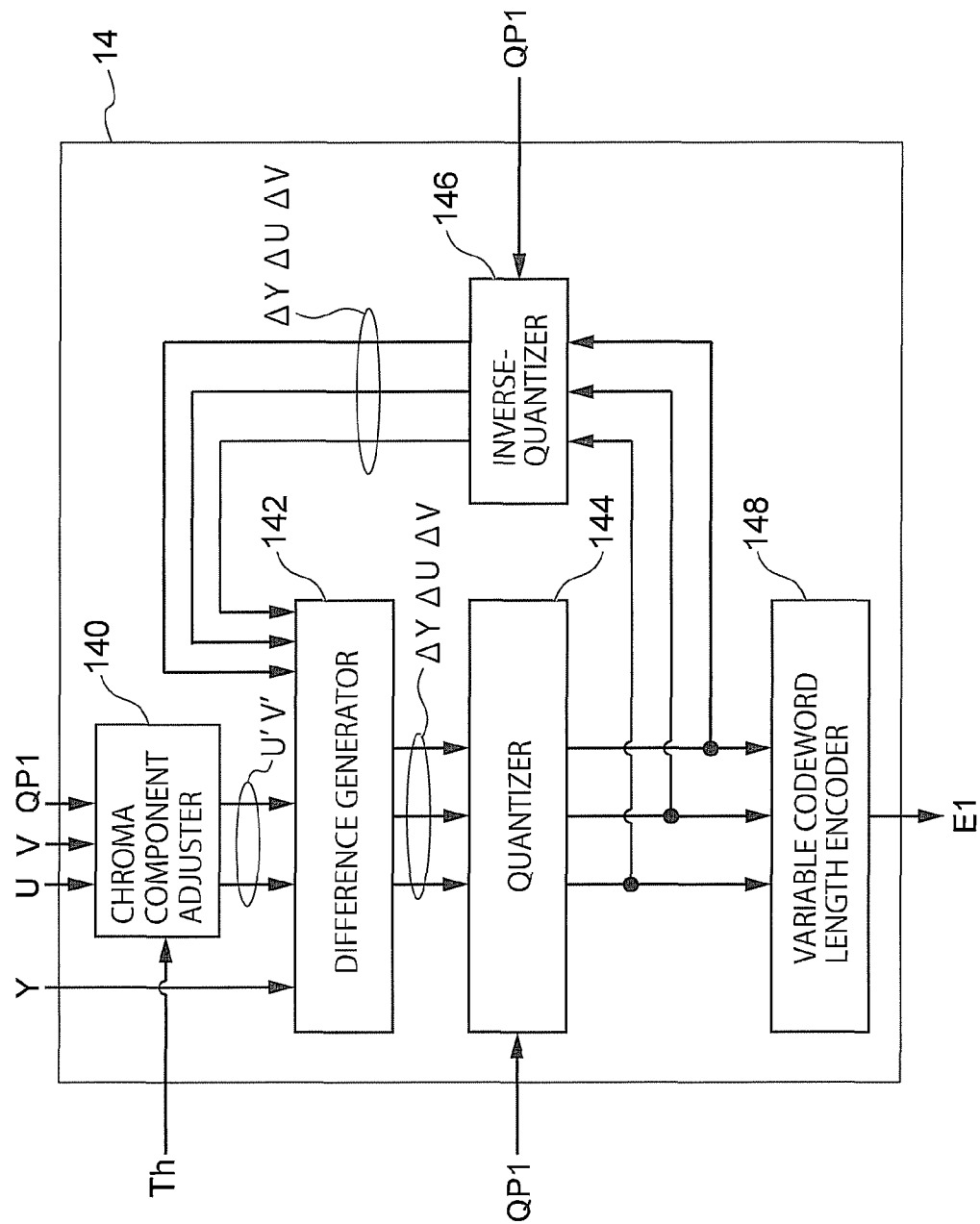
FIG. 3 is a block diagram of the first image encode controller 14 of the first embodiment.

FIG. 3 is a block diagram of the first image encode controller 14 of the first embodiment. The first image encode controller 14 has a chroma component adjuster 140, a difference generator 142, a quantizer 144, an inverse-quantizer 146, and a variable codeword length encoder 148.

The chroma component adjuster 140 receives original chroma components (U0 and V0) of the original pixels, the first quantization coefficient QP1, and the threshold Th, and the chroma component adjuster 140 adjusts the original chroma components in accordance with the first quantization coefficient QP1, thereby generating adjusted chroma components (a first adjusted chroma component U' and a second adjusted chroma component V').

Figure 4:
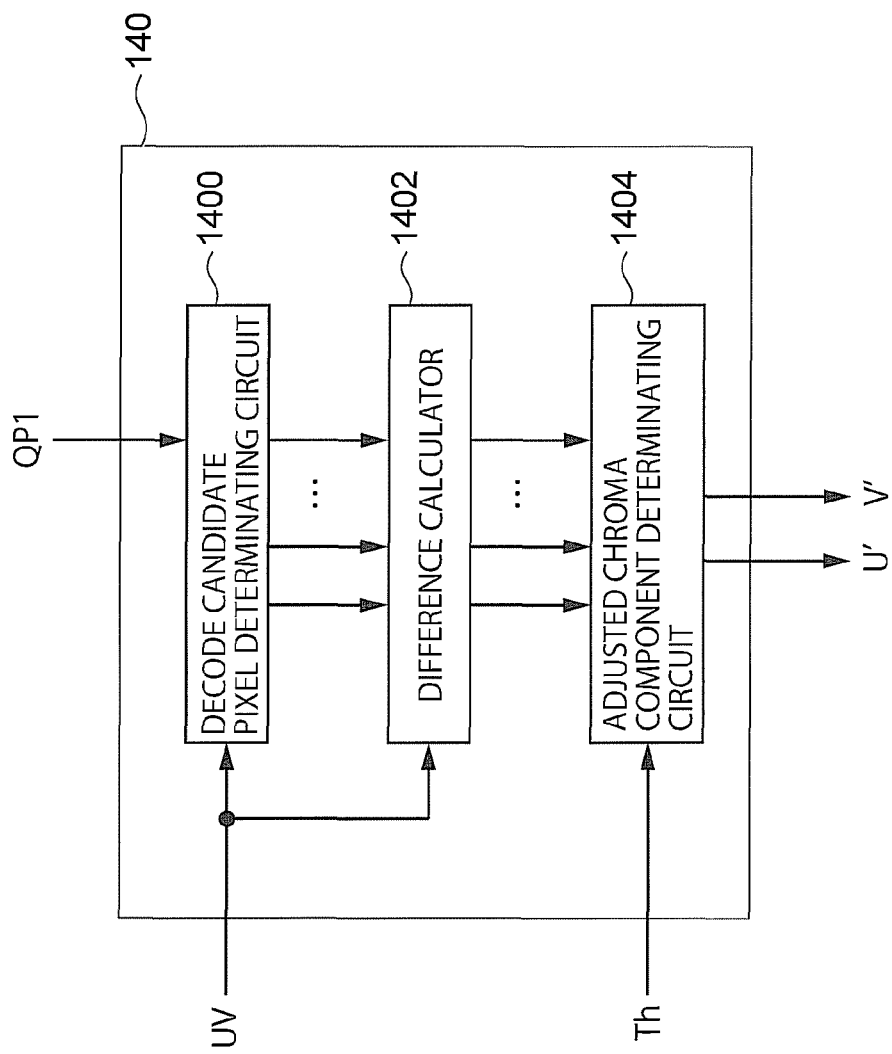
FIG. 4 is a block diagram of the chroma component adjuster 140 of the first embodiment.

FIG. 4 is a block diagram of the chroma component adjuster 140 of the first embodiment. The chroma component adjuster 140 has a decode candidate pixel determining circuit 1400, a difference calculator 1402, and an adjusted chroma component determining circuit 1404.

The decode candidate pixel determining circuit 1400 determines a plurality of decode candidate pixels so as to reduce the quantization error on the basis of the original chroma components (U0 and V0) and the first quantization coefficient QP1.

Figure 5:
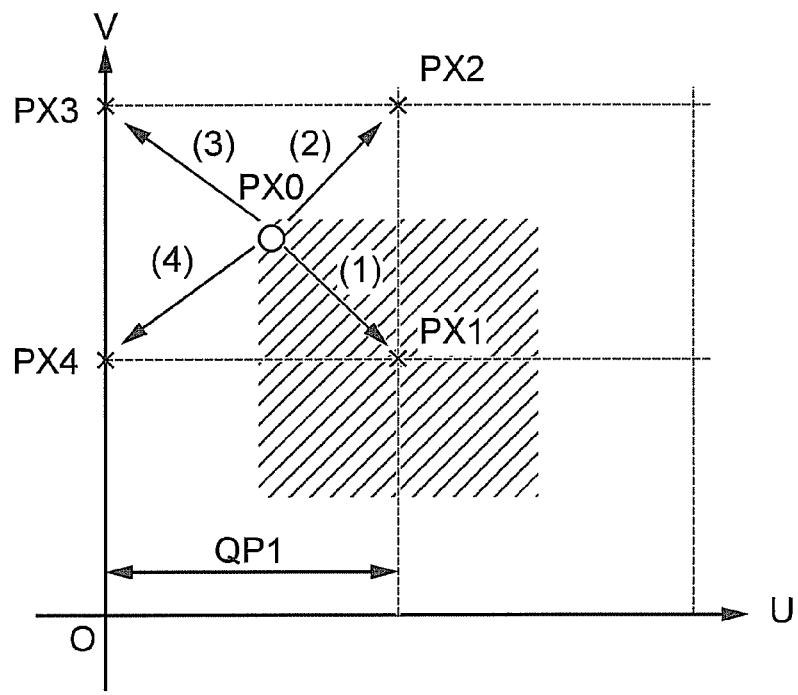
FIG. 5 is a diagram for explaining the operation of the decode candidate pixel determining circuit 1400 of the first embodiment.

FIG. 5 is a diagram for explaining the operation of the decode candidate pixel determining circuit 1400 of the first embodiment. The decode candidate pixel determining circuit 1400 generates a lattice point on a chroma component plane (hereinbelow, called "UV plane") as a two-dimensional space. The UV plane includes a reference point O defined by a dynamic range of the original image data and a plurality of lattice points arranged at intervals according to the first quantization coefficient Q1. That is, the interval between lattice points depends on a quantization step. For example, in the case that the bit rate of the original image data is eight bits, 128 bits as a center of the dynamic range in the original image data correspond to the reference point O.

Subsequently, the decode candidate pixel determining circuit 1400 determines a pixel positioned in the decode origin corresponding to the original chroma components (U0, V0) in the UV plane as a decode origin pixel PX0, and determines pixels positioned in four lattice points (hereinbelow, called "decode candidate points") adjacent to the decode origin as decode candidate pixels PX1 to PX4. That is, a quantization error caused by quantization processes (quantization, inverse-quantization, and addition to predictive pixel) with respect to the decode candidate pixels PX1 to PX4 is smaller than that caused by the quantization processes with respect to the decode origin pixel PX0.

The difference calculator 1402 in FIG. 4 calculates a phase difference ΔP of each of the decode candidate pixels on the basis of the original chroma components (U0, V0) and each of the decode candidate pixels. The larger the phase difference is, the large the quantization error of hue is.

Figure 6:
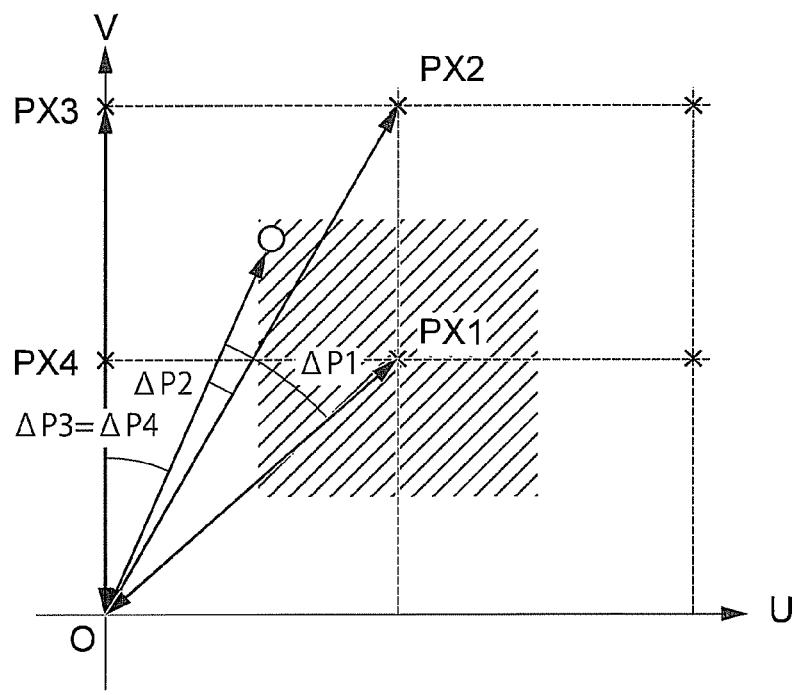
FIG. 6 is a diagram for explaining the operation of the difference calculator 1402 of the first embodiment.

FIG. 6 is a diagram for explaining the operation of the difference calculator 1402 of the first embodiment. The phase difference component ΔP is an angle formed by a decoded origin line connecting the origin and a decode origin and a decode candidate line connecting the origin and a decode candidate point in the UV plane. That is, angles formed by decode candidate lines corresponding to the decode candidate pixels PX1 to PX4 and the decode origin lines are phase differences ΔP1 to ΔP4, respectively.

The adjusted chroma component determining circuit 1404 in FIG. 4 determines adjusted chroma components (U', V') on the basis of the phase differences ΔP1 to ΔP4 and the threshold Th.

Figure 7:
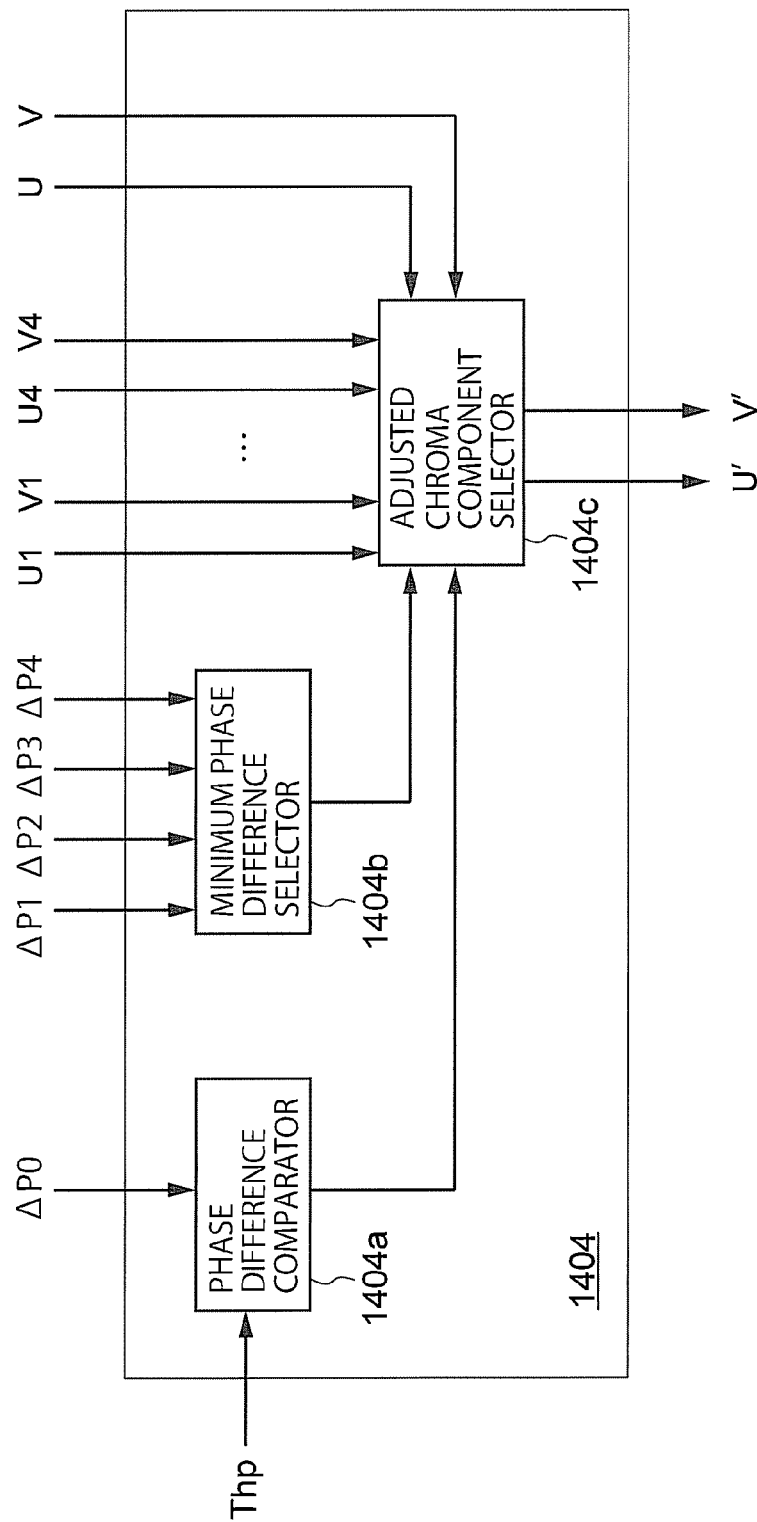
FIG. 7 is a block diagram of the adjusted chroma component determining circuit 1404 of the first embodiment.

FIG. 7 is a block diagram of the adjusted chroma component determining circuit 1404 of the first embodiment. The adjusted chroma component determining circuit 1404 has a phase difference comparator 1404a, a minimum phase difference selector 1404b, and an adjusted chroma component selector 1404c.

The phase difference comparator 1404a outputs a binary signal according to the difference between a phase difference threshold Thp and an original phase difference ΔP0. The phase difference threshold value Thp is information included in the threshold Th. The original phase difference ΔP0 corresponds to an angle (any of ΔP1 to ΔP4) formed by a point corresponding to a pixel obtained by encoding the original pixel P0 by an arbitrary encoding method and the decode origin in the UV plane. For example, the phase difference comparator 1404a outputs a comparison signal "0" when the original phase difference ΔP0 is less than the phase difference threshold Thp, and the phase difference comparator 1404a outputs a comparison signal "1" when the original phase difference ΔP0 is equal to or larger than the phase difference threshold Thp. In the case where the original phase difference ΔP0 is equal to the phase difference threshold Thp, the phase difference comparator 1404a may output the comparison signal "0" instead of the comparison signal "1".

The minimum phase difference selector 1404b selects the minimum phase difference from the phase differences ΔP1 to ΔP4.

On the basis of the comparison signal, the adjusted chroma component selector 1404c selects adjusted chroma components (U', V') from the original chroma components (U0, V0) of the decode original pixel PX0 and decode candidate chroma components (U1, V1) to (U4, V4) of the decode candidate pixels PX1 to PX4.

Concretely, in the case where the phase difference comparator outputs the comparison signal "0" (that is, in the case where the original phase difference ΔP0 is less than the phase difference threshold Thp), the adjusted chroma component selector 1404c selects the original chroma components (U0, V0) of the decode original pixel PX0 as the adjusted chroma components (U', V').

On the other hand, in the case where the phase difference comparator outputs the comparison signal "1" (that is, in the case where the original phase difference ΔP0 is equal to or larger than the phase difference threshold Thp), the adjusted chroma component selector 1404c selects any of the decode candidate chroma components (U1, V1) to (U4, V4) of the decode candidate pixel corresponding to the minimum phase difference component as the adjusted chroma components (U', V'). In other words, the adjusted chroma component determining circuit 1404 determines the adjusted chroma components (U', V') in such a manner that the quantization error of hue becomes the minimum.

The difference generator 142 in FIG. 3 generates difference pixel components ΔYUV(i) (a difference luminance component ΔY(i), a first difference adjusted chroma component ΔU(i), and a second difference adjusted chroma component ΔV(i)) from the luminance component Y(i) and the adjusted chroma components (U'(i), V'(i)) corresponding to the i-th pixel PX(i) (where i denotes a natural number), and the luminance component Y(i−1) and the adjusted chroma components (U'(i−1), V'(i−1)) corresponding to the pixel PX(i−1). That is, the difference pixel components ΔYUV(i) corresponding to the pixel PX(i) are {ΔY(i), ΔU(i), ΔV(i)}={Y(i−1)−Y(i), U'(i)−U'(i−1) V'(i)−V'(i−1)}.

The quantizer 144 quantizes the difference pixel component ΔYUV(i) on the basis of the first quantization coefficient QP1.

The inverse-quantizer 146 inversely quantizes an output of the quantizer 144 on the basis of the first quantization coefficient QP1. That is, an output of the inverse-quantizer 146 is the difference pixel component ΔYUV(i). In other words, when the difference generator 142 receives the luminance component Y(i+1) and the adjusted chroma components (U'(i+1), V'(i+1)) corresponding to the pixel PX(i+1), the inverse-quantizer 146 supplies the difference pixel component ΔYUV(i) to the difference generator 142.

The variable codeword length encoder 148 executes variable-length encoding with respect to an output of the quantizer 144, thereby generating first encoded data E1.

Figure 8:
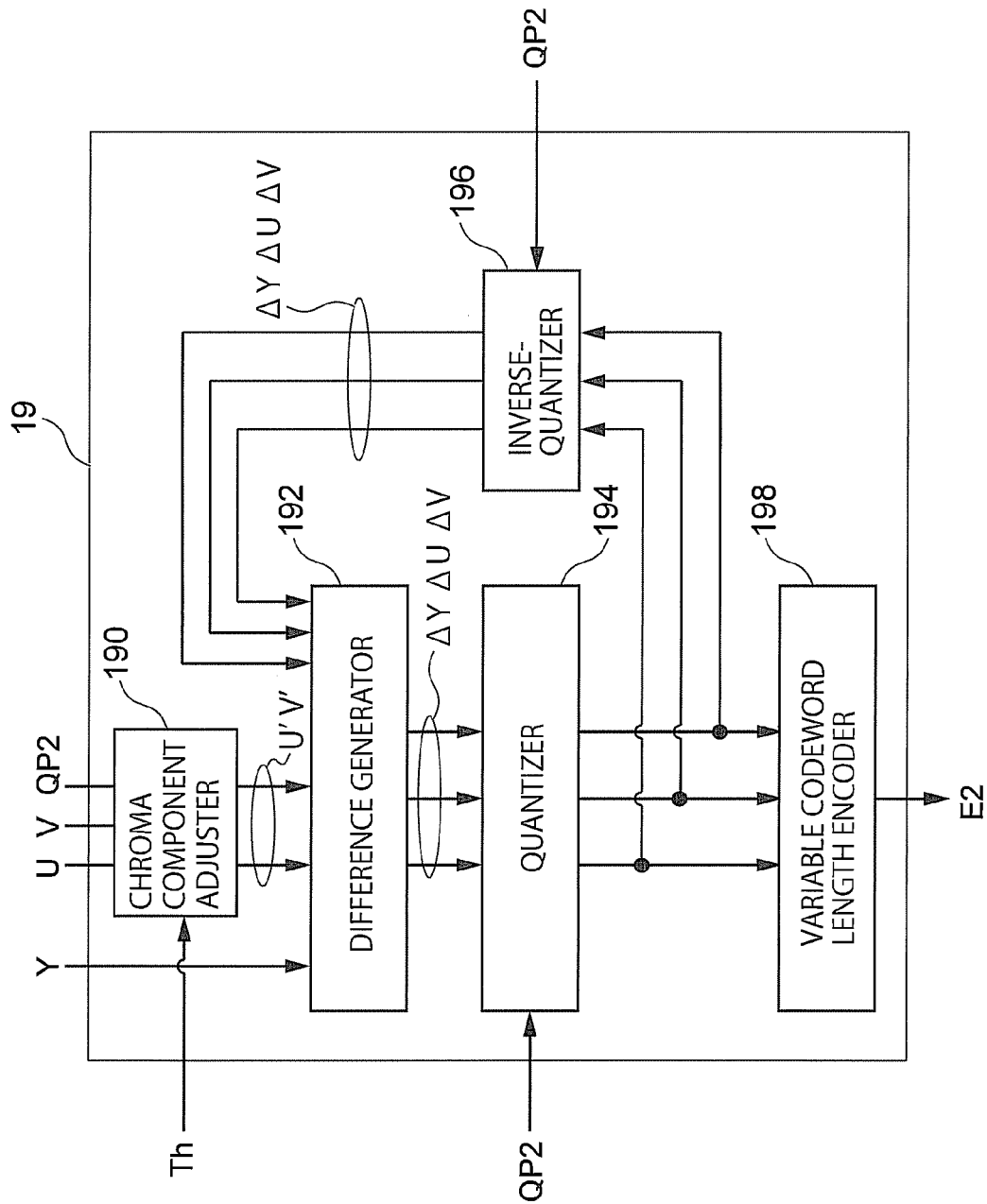
FIG. 8 is a block diagram of the second image encode controller 19 of the embodiment.

FIG. 8 is a block diagram of the second image encode controller 19 of the embodiment. The second image encode controller 19 has a chroma component adjuster 190, a difference generator 192, a quantizer 194, an inverse-quantizer 196, and a variable codeword length encoder 198. The difference generator 192 is similar to the difference generator 142 of FIG. 3.

The chroma component adjuster 190 receives the origin chroma components (U0, V0) held in the input data buffer 18, the second quantization coefficient QP2, and the threshold Th. The chroma component adjuster 190 adjusts the origin chroma component in accordance with the second quantization coefficient QP2, thereby generating the adjusted chroma components (U', V').

The configuration of the chroma component adjuster 190 is similar to that of the chroma component adjuster 140. That is, the chroma component adjuster 190 has the decode candidate pixel determining circuit 1400, the difference calculator 1402, and the adjusted chroma component determining circuit 1404.

The quantizer 194 quantizes outputs of the difference generator 192 (that is, the difference pixel components ΔYUV(i)) on the basis of the second quantization coefficient QP2.

The inverse-quantizer 196 inversely quantizes outputs of the quantizer 194 on the basis of the second quantization coefficient QP2. Specifically, outputs of the inverse-quantizer 196 are difference pixel components ΔYUV(i). In other words, when the difference generator 192 receives the luminance component Y(i+1) and the adjusted chroma components (U'(i+1) and V'(i+1)) corresponding to the pixel PX(i+1), the inverse-quantizer 196 supplies the difference pixel components ΔYUV(i) to the difference generator 192.

The variable codeword length encoder 198 writes second encoded data E2 generated by performing variable codeword length encoding with respect to the output of the quantizer 194 into the memory 30.

A modification of the first embodiment will be described. A modification of the first embodiment relates to an example of realizing the chroma component adjusting process of the adjusted chroma component determining circuit 1404 by software. In the modification of the first embodiment, the image encoder 10 is realized by a processor.

Figure 9:
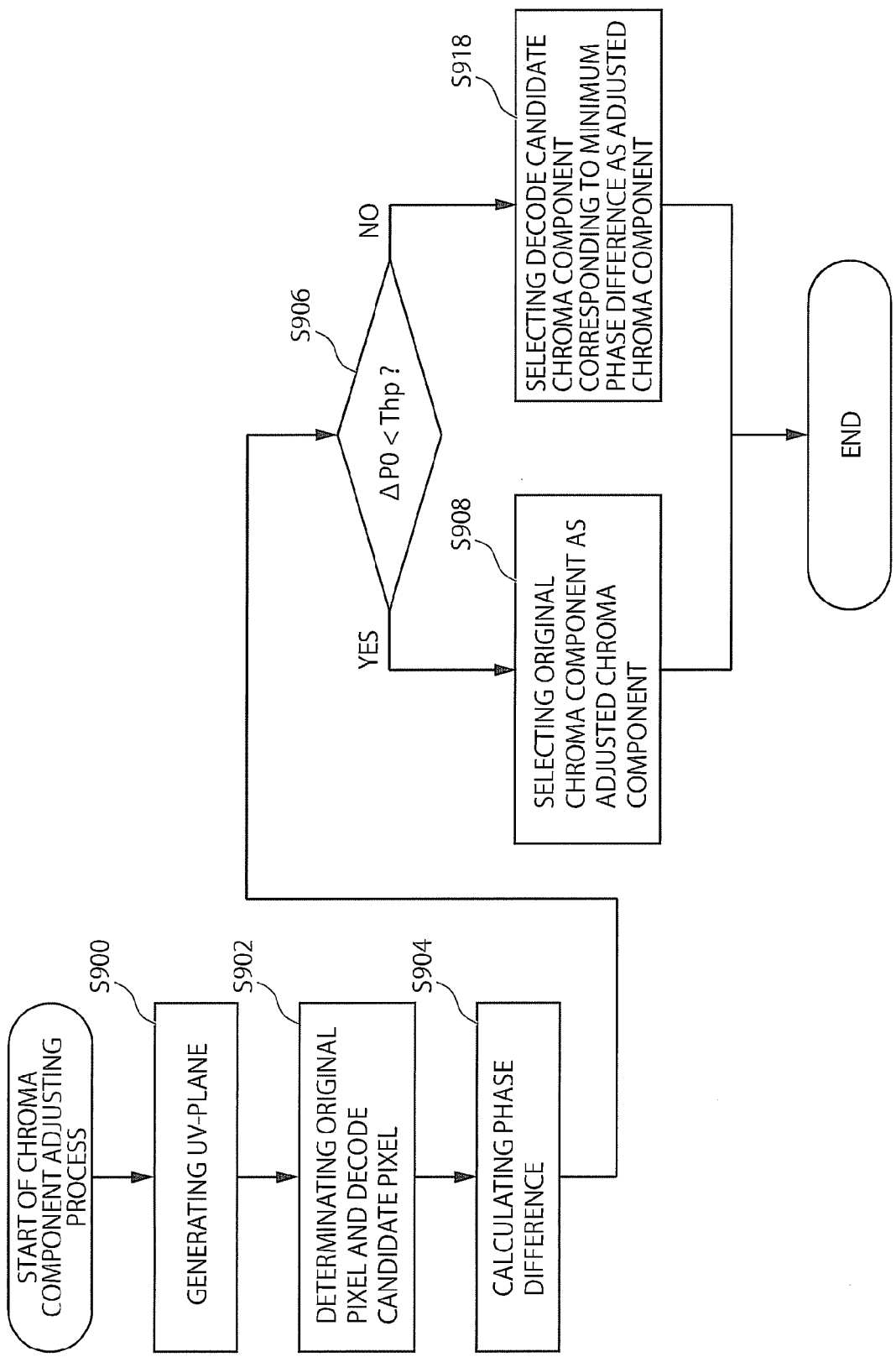
FIG. 9 is a flowchart of the chroma component adjusting process of the modification of the first embodiment.

FIG. 9 is a flowchart of the chroma component adjusting process of the modification of the first embodiment. The chroma component adjusting process is executed when the image encoder 10 starts a computer program in which at least one process step is written.
(S900 to S902)

A UV plane including a lattice point is generated (S900). A pixel positioned in the decode origin in the UV plane is determined as the decode origin pixel PX0, and pixels positioned in four decode candidate points are determined as the decode candidate pixels PX1 to PX4 (S902).
(S904 to S918)

On the basis of the original chroma components (U0, V0) and the plurality of decode candidate pixels PX1 to PX4, the original phase difference ΔP0 and the phase differences ΔP1 to ΔP4 of the decode candidate pixels are calculated (S904). In the case where the original phase difference ΔP0 is less than the phase difference threshold Thp (Y in S906), the original chroma components are selected as adjusted chroma components (the first and second adjusted chroma components U' and V') (S908). On the other hand, in the case where the original phase difference ΔP0 is equal to or larger than the phase difference threshold Thp (N in S906), the decode candidate chroma component corresponding to the minimum phase difference in the decode candidate chroma components (U1, V1) to (U4, V4) is selected as an adjusted chroma component (S918).

When the chroma component adjusting process is finished, the quantizing process is executed with respect to the adjusted chroma components selected in S908 or S918.

According to the first embodiment, the second encoded data E2 is obtained by encoding image data in consideration of a quantization error (particularly, a quantization error of hue). Consequently, as compared with the case where the quantization error is not considered, the quality (particularly, hue) of a decoded image can be improved.
(Second Embodiment)

A second embodiment relates to an example of an image encoder in which the quality of a decoded image is improved in consideration of quantization errors in hue and saturation. Description of content similar to that of the first embodiment will not be repeated.

In the second embodiment, on the basis of the original chroma components (U0, V0) and a plurality of decode candidate pixels, the difference calculator 1402 of FIG. 4 calculates a gain difference of each of the decode candidate pixels in addition to the phase difference of each of the decode candidate pixels. The larger the gain difference is, the larger the quantization error of saturation is.

Figure 10:
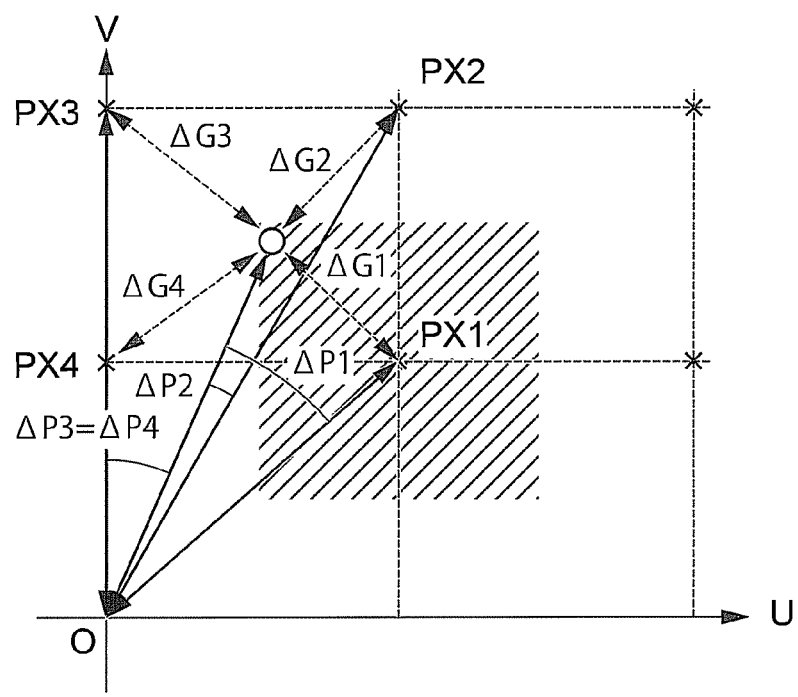
FIG. 10 is a diagram for explaining the operation of the difference calculator 1402 of the second embodiment.

FIG. 10 is a diagram for explaining the operation of the difference calculator 1402 of the second embodiment. The difference calculator 1402 calculates the phase differences ΔP1 to ΔP4 in a manner similar to the first embodiment. The difference calculator 1402 calculates the gain differences ΔG1 to ΔG4 in the UV plane. That is, the gain differences ΔG1 to ΔG4 are distances between the decode candidate points corresponding to the decode candidate pixels PX1 to PX4 and the decode origin.

The adjusted chroma component determining circuit 1404 of the second embodiment determines adjusted chroma components (U', V') on the basis of the gain differences ΔG1 to ΔG4, the phase differences ΔP1 to ΔP4, and the threshold Th.

Figure 11:
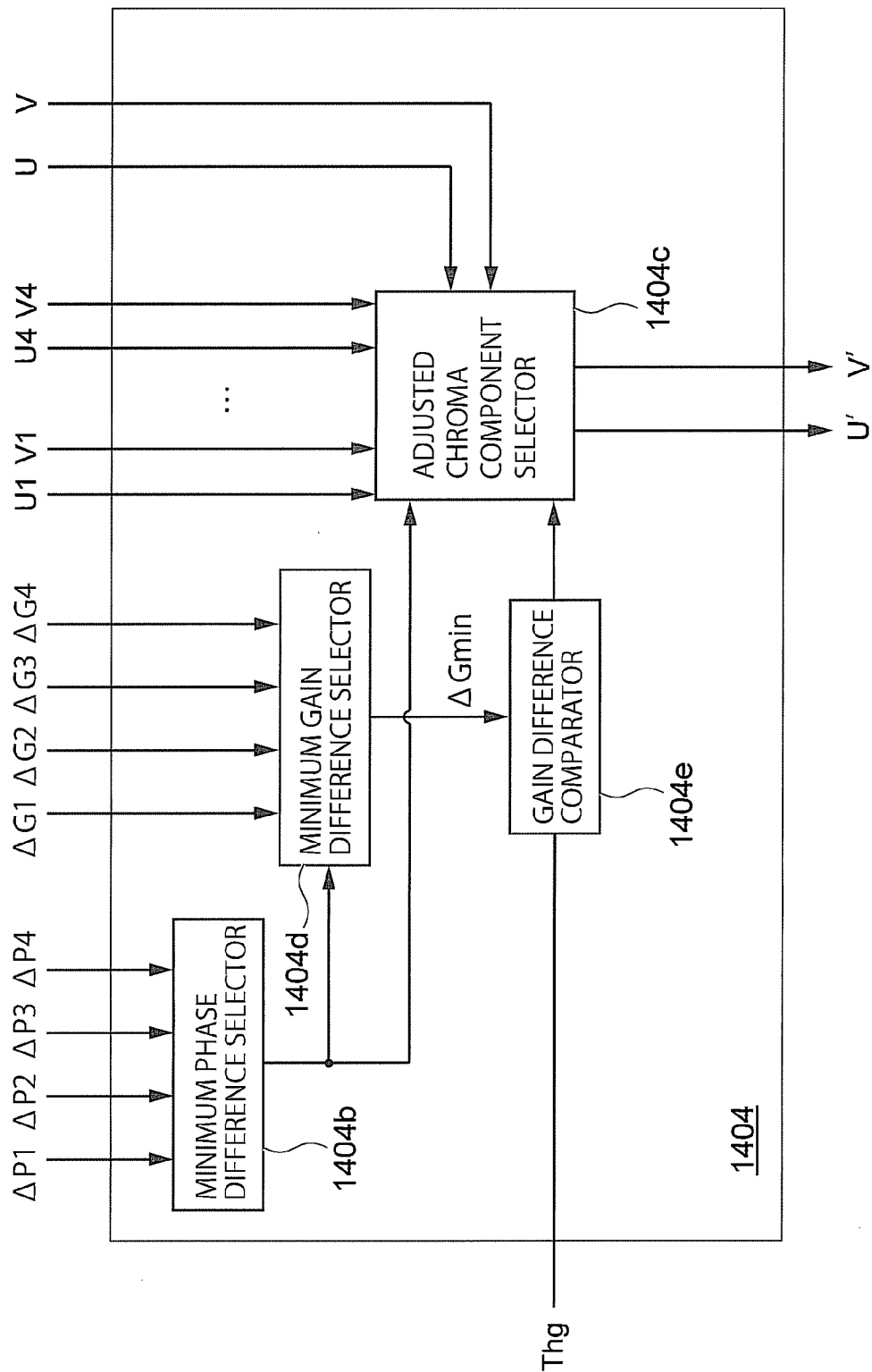
FIG. 11 is a block diagram of the adjusted chroma component determining circuit 1404 of the second embodiment.

FIG. 11 is a block diagram of the adjusted chroma component determining circuit 1404 of the second embodiment. The adjusted chroma component determining circuit 1404 includes the minimum phase difference selector 1404b, the adjusted chroma component selector 1404c, a minimum gain difference selector 1404d, and a gain difference comparator 1404e. The minimum phase difference selector 1404b is similar to that of the first embodiment.

The minimum gain difference selector 1404d selects the minimum gain difference ΔGmin corresponding to the minimum phase difference from the gain differences ΔG1 to ΔG4. For example, in the case where the minimum phase difference is the phase difference ΔP1, ΔGmin=ΔG1.

The gain difference comparator 1404e compares the gain difference threshold Thg with the minimum gain difference ΔGmin. The gain difference threshold Thg is information included in the threshold Th. The gain difference comparator 1404e outputs a comparison signal "0" when the minimum gain difference ΔGmin is less than the gain difference threshold Thg, and outputs a comparison signal "1" when the minimum gain difference ΔGmin is equal to or larger than the gain difference threshold Thg. In the case where the minimum gain difference ΔGmin is equal to the gain difference threshold Thg, the gain difference comparator 1404e may output the comparison signal "0".

On the basis of the comparison signal and the minimum phase difference component, the adjusted chroma component selector 1404c selects the adjusted chroma components (U', V') from the original chroma components (U0, V0) of the decode pixel PX0 and the decode candidate chroma components (U1, V1) to (U4, V4) of the decode candidate pixels PX1 to PX4.

Concretely, in the case where the gain difference comparator 1404e outputs the comparison signal "0" (that is, in the case where the minimum gain difference ΔGmin is less than the gain difference threshold Thg), the adjusted chroma component selector 1404c selects the original chroma components (U0, V0) of the decode original pixel PX0 as the adjusted chroma components (U', V').

On the other hand, in the case where the gain difference comparator 1404e outputs the comparison signal "1" (that is, in the case where the minimum gain difference ΔGmin is equal to or larger than the gain difference threshold Thp), the adjusted chroma component selector 1404c selects any of the decode candidate chroma components (U1, V1) to (U4, V4) of the decode candidate pixel corresponding to the minimum gain difference as the adjusted chroma components (U', V').

In other words, the adjusted chroma component determining circuit 1404 in FIG. 11 determines the adjusted chroma components (U', V') in such a manner that the quantization errors of hue and saturation become the minimum.

Figure 12:
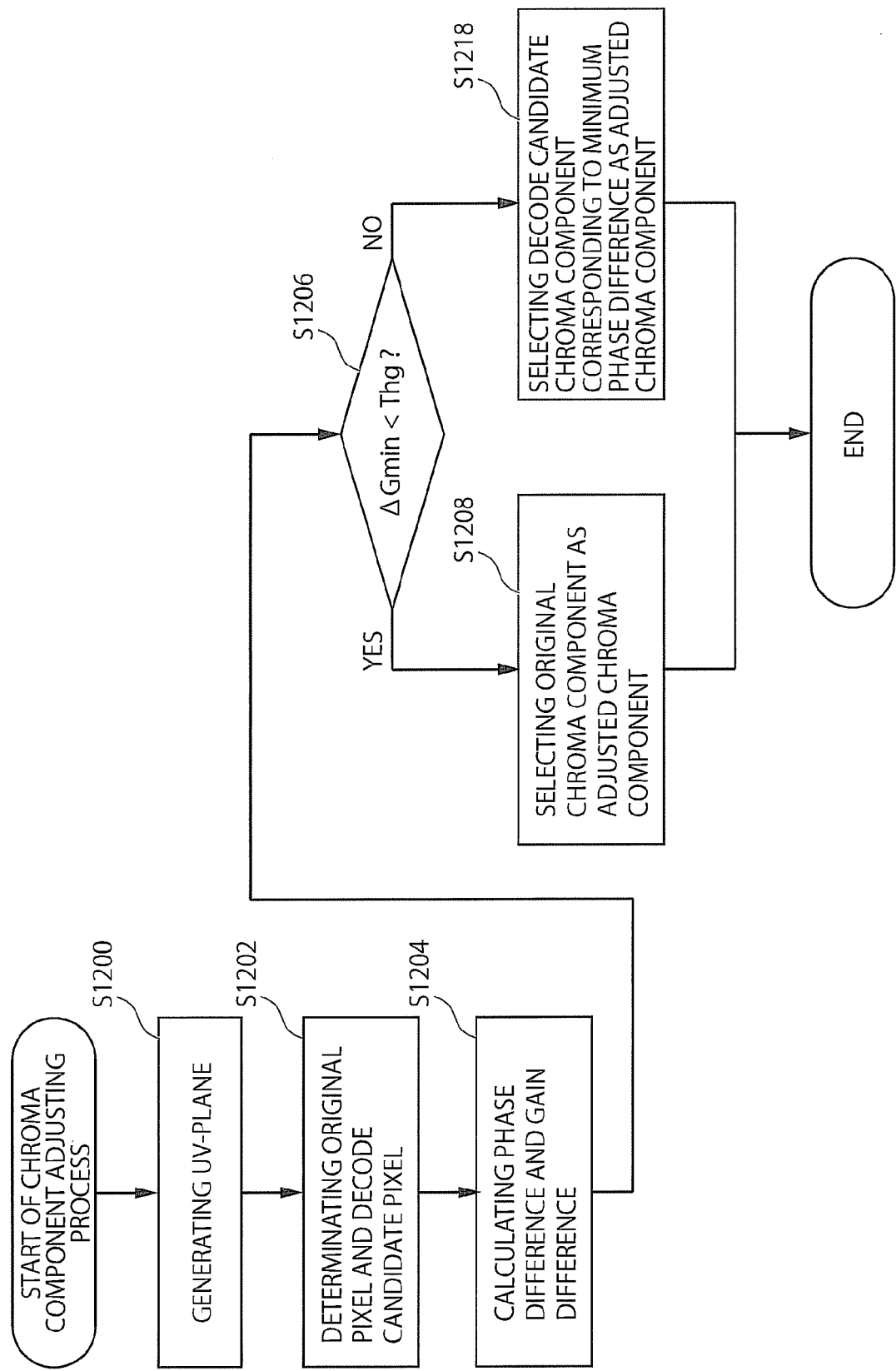
FIG. 12 is a flowchart of the chroma component adjusting process of the modification of the second embodiment.

The chroma component adjusting process of a modification of the second embodiment will be described. FIG. 12 is a flowchart of the chroma component adjusting process of the modification of the second embodiment. The chroma component adjusting process is executed when the image encoder 10 starts a computer program in which at least one process step is written.

(S1200 and S1202)

S1200 and S1202 are similar to S900 and S902 in FIG. 9 of the first embodiment, respectively.

(S1204 to S1218)

On the basis of the original chroma components (U0, V0) and each of the decode candidate pixels, the original phase difference ΔP0, the phase differences ΔP1 to ΔP4 of the decode candidate pixels, and the gain differences ΔG1 to ΔG4 are calculated (S1204). In the case where the minimum gain difference ΔGmin is less than the gain difference threshold Thg (Y in S1206), the original chroma components (U0, V0) are selected as adjusted chroma components (U' and V') (S1208). On the other hand, in the case where the minimum gain difference ΔGmin is equal to or larger than the gain difference threshold Thg (N in S1206), the decode candidate chroma component corresponding to the minimum gain difference ΔGmin in the decode candidate chroma components (U1, V1) to (U4, V4) is selected as an adjusted chroma component (S1218).

When the chroma component adjusting process is finished, the quantizing process is executed on the adjusted chroma components selected in S1208 or S1218.

According to the second embodiment, the second encoded data E2 is obtained by encoding image data in consideration of a quantization error (particularly, quantization errors of saturation and hue). Consequently, as compared with the case where the quantization error is not considered, the quality (particularly, both of saturation and hue) of a decoded image can be improved.

Incidentally, although an example of determining pixels positioned in four decode candidate points as the decode candidate pixels PX1 to PX4 (that is, determining four decode candidate pixels) has been described in the embodiment, the number of decode candidate pixels is arbitrary.

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image encode controller executed by a processor comprising:
    a chroma component adjuster configured to adjust an original color component of an original pixel of original image data in accordance with a quantization coefficient to generate an adjusted chroma component;
    a difference generator configured to generate a difference pixel component;
    a quantizer configured to quantize an output of the difference generator on the basis of the quantization coefficient;
    an inverse-quantizer configured to inversely quantize an output of the quantizer on the basis of the quantization coefficient; and a variable codeword length encoder configured to perform variable codeword length encoding with respect to an output of the quantizer to generate encoded data, wherein the difference generator generates the difference pixel component on the basis of a pixel component corresponding to an i-th pixel (where i denotes natural number), the adjusted chroma component, and an output of the inverse-quantizer corresponding to the (i−1)th pixel.

2. The controller of claim 1, wherein the chroma component adjuster comprises:
a decode candidate pixel determining circuit configured to determine at least one decode candidate pixel in such a manner that a quantization error is decreased on the basis of the original chroma component and the quantization coefficient;
a difference calculator configured to calculate a phase difference of the decode candidate pixel on the basis of the original chroma component and the decode candidate pixel; and
an adjusted chroma component determining circuit configured to determine the adjusted chroma component on the basis of the phase difference.

3. The controller of claim 2, wherein the decode candidate pixel determining circuit determines, as the decode candidate pixel, a pixel positioned in at least one decode candidate point adjacent to a decode origin corresponding to an original chroma component of the original pixel in a chroma plane comprising points arranged at intervals according to the quantization coefficient.

4. The controller of claim 3, wherein the difference calculator calculates, as the phase difference, an angle formed by a decode original line and a decode candidate line, the decode original line connecting a reference point defined by a dynamic range of the original image data and the decode origin, the decode candidate line connecting the reference point and the decode candidate point, in the plane.

5. The controller of claim 3, wherein when there are a plurality of decode candidate pixels, the adjusted chroma component determining circuit determines the adjusted chroma component in such a manner that a quantization error of hue becomes the minimum.

6. The controller of claim 5, wherein the adjusted chroma component determining circuit comprises:
a minimum phase difference selector configured to select a minimum phase difference from phase differences corresponding to the decode candidate pixels; and
an adjusted chroma component selector configured to select, as the adjusted chroma component, a decode candidate chroma component corresponding to the minimum phase difference or the original chroma component in accordance with the difference between an original phase difference and a phase difference threshold, the original phase difference corresponding to an angle formed by a point corresponding to a pixel obtained by encoding the original pixel and the decode origin, in the plane.

7. The controller of claim 6, wherein in the case where the original phase difference is less than the phase difference threshold, the adjusted chroma component selector selects the original chroma component as the adjusted chroma component and, in the case where the original phase difference is equal to or larger than the phase difference threshold, the adjusted chroma component selector selects the decode candidate chroma component as the adjusted chroma component.

8. The controller of claim 6, wherein the adjusted chroma component determining circuit further comprises a phase difference comparator configured to output a binary signal according to the difference between the original phase difference and the phase difference threshold, and
the adjusted chroma component selector selects, as the adjusted chroma component, the decode candidate chroma component or the original chroma component in accordance with the binary signal.

9. The controller of claim 2, wherein the difference calculator further calculates a gain difference of the decode candidate pixel on the basis of the original chroma component and the decode candidate pixel, and
the adjusted chroma component determining circuit determines the adjusted chroma component on the basis of the phase difference and the gain difference.

10. The controller of claim 9, wherein the decode candidate pixel determining circuit determines, as the decode candidate pixel, a pixel positioned in at least one decode candidate point adjacent to a decode origin corresponding to an original chroma component of the original pixel in a chroma plane comprising points arranged at intervals according to the quantization coefficient.

11. The controller of claim 10, wherein the difference calculator calculates, as the phase difference, an angle formed by a decode original line and a decode candidate line, the decode original line connecting a reference point defined by a dynamic range of the original image data and the decode origin, the decode candidate line connecting the reference point and the decode candidate point, in the plane.

12. The controller of claim 10, wherein when there are a plurality of decode candidate pixels, the adjusted chroma component determining circuit determines the adjusted chroma component in such a manner that a quantization error of hue becomes the minimum.

13. The controller of claim 12, wherein the adjusted chroma component determining circuit comprises:
a minimum phase difference selector configured to select a minimum phase difference from phase differences corresponding to the decode candidate pixels;
a minimum gain difference selector configured to select a minimum gain difference corresponding to the minimum phase difference from gain differences corresponding to the decode candidate pixels; and
an adjusted chroma component selector configured to select, as the adjusted chroma component, a decode candidate chroma component corresponding to the minimum phase difference or the original chroma component in accordance with the difference between the minimum gain difference and a gain difference threshold.

14. The controller of claim 13, wherein in the case where the minimum gain difference is less than the gain difference threshold, the adjusted chroma component selector selects the original chroma component as the adjusted chroma component and, in the case where the minimum gain phase difference is equal to or larger than the gain difference threshold, the adjusted chroma component selector selects the decode candidate chroma component as the adjusted chroma component.

15. The controller of claim 13, wherein the adjusted chroma component determining circuit further comprises a gain difference comparator configured to output a binary signal according to the difference between the minimum gain difference and the gain difference threshold, and
the adjusted chroma component selector selects, as the adjusted chroma component, the decode candidate chroma component or the original chroma component in accordance with the binary signal.

16. An image encoder executed by a processor comprising:
a plurality of first image encode controllers configured to encode original image data on the basis of a plurality of first quantization coefficients to generate first encoded data, the first quantization coefficients being different from each other;
an encode rate controller configured to determine a second quantization coefficient on the basis of the first encoded data; and
a second encode controller configured to encode the original image data on the basis of the second quantization coefficient to generate second encoded data, wherein
the first image encode controllers and the second image encode controller comprise:
a chroma component adjuster configured to adjust an original color component of an original pixel of the original image data in accordance with the first quantization coefficients and the second quantization coefficient to generate an adjusted chroma component, respectively;
a difference generator configured to generate a difference pixel component;
a quantizer configured to quantize an output of the difference generator on the basis of the first quantization coefficients and the second quantization coefficient, respectively;
an inverse-quantizer configured to inversely quantize an output of the quantizer on the basis of the first quantization coefficients and the second quantization coefficient, respectively; and
a variable codeword length encoder configured to perform variable codeword length encoding with respect to an output of the quantizer to generate the first encoded data and the second encoded data, respectively,
wherein the difference generator generates the difference pixel component on the basis of a pixel component corresponding to an i-th pixel (where i denotes natural number), the adjusted chroma component, and an output of the inverse-quantizer corresponding to the (i−1)th pixel.

17. The encoder of claim 16, wherein the chroma component adjuster comprises:
a decode candidate pixel determining circuit configured to determine at least one decode candidate pixel in such a manner that a quantization error is decreased on the basis of the original chroma component and the first quantization coefficients or the second quantization coefficient;
a difference calculator configured to calculate a phase difference of the decode candidate pixel on the basis of the original chroma component and the decode candidate pixel; and
an adjusted chroma component determining circuit configured to determine the adjusted chroma component on the basis of the phase difference.

18. The encoder of claim 17, wherein the decode candidate pixel determining circuit determines, as the decode candidate pixel, a pixel positioned in at least one decode candidate point adjacent to a decode origin corresponding to an original chroma component of the original pixel in a chroma plane comprising points arranged at intervals according to the first quantization coefficients or the second quantization coefficient.

19. The encoder of claim 17, wherein the difference calculator further calculates a gain difference of the decode candidate pixel on the basis of the original chroma component and the decode candidate pixel, and
the adjusted chroma component determining circuit determines the adjusted chroma component on the basis of the phase difference and the gain difference.

20. A computer implemented method for encoding image data, the method comprising:
adjusting an original color component of an original pixel of original image data in accordance with a quantization coefficient to generate an adjusted chroma component;
generating a difference pixel component;
quantizing the difference pixel component on the basis of the quantization coefficient;
inversely quantizing the quantized difference pixel component on the basis of the quantization coefficient; and
performing variable codeword length encoding with respect to the quantized difference pixel component to generate encoded data,
wherein in quantizing the difference pixel component, the difference pixel component is generated on the basis of a pixel component corresponding to an i-th pixel (where i denotes natural number), the adjusted chroma component, and the inversely quantizing difference pixel component corresponding to the (i−1)th pixel.

* * * * *